(12) United States Patent
Wang et al.

(10) Patent No.: US 11,160,065 B2
(45) Date of Patent: Oct. 26, 2021

(54) MAPPING METHOD AND APPARATUS FOR A SEARCH SPACE OF A PHYSICAL DOWNLINK CONTROL CHANNEL

(71) Applicant: FUJITSU LIMITED, Kawasaki (JP)

(72) Inventors: Yi Wang, Beijing (CN); Yuantao Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/303,788

(22) Filed: Jun. 13, 2014

(65) Prior Publication Data

US 2014/0293924 A1  Oct. 2, 2014

Related U.S. Application Data

(63) Continuation of application No. PCT/CN2011/084832, filed on Dec. 28, 2011.

(51) Int. Cl.
*H04W 72/04* (2009.01)
*H04L 5/00* (2006.01)
*H04L 1/00* (2006.01)

(52) U.S. Cl.
CPC ......... *H04W 72/042* (2013.01); *H04L 5/0053* (2013.01); *H04L 5/0058* (2013.01); *H04L 1/0038* (2013.01); *H04L 5/0007* (2013.01)

(58) Field of Classification Search
None
See application file for complete search history.

(56) References Cited

U.S. PATENT DOCUMENTS

| 8,537,768 B2 * | 9/2013 | Yamada | H04W 72/042 370/329 |
|---|---|---|---|
| 2012/0063401 A1 | 3/2012 | Xue et al. | |
| 2012/0218969 A1 | 8/2012 | Tan | |

(Continued)

FOREIGN PATENT DOCUMENTS

| CN | 101646198 A | 2/2010 |
|---|---|---|
| CN | 101699901 A | 4/2010 |

(Continued)

OTHER PUBLICATIONS

Office Action issued by the Japan Patent Office for corresponding Japanese Patent Application No. 2014-549286, dated Aug. 18, 2015, with an English translation.

(Continued)

*Primary Examiner* — Willie J Daniel, Jr.
(74) *Attorney, Agent, or Firm* — Myers Wolin, LLC (57) ABSTRACT

Embodiments of the present invention provide a mapping method and apparatus for a search space of a physical downlink control channel. The method includes: determining a search space allocated to the PDCCH according to a resource allocation scheme; and mapping each of candidates of the PDCCH to a logic time frequency resource of the search space according to a predefined interval. With the method and apparatus of the embodiments of the present invention, a frequency selective scheduling gain is obtained by mapping different candidates onto discrete time frequency resources, or a frequency diversity gain is obtained by mapping one candidate onto discrete time frequency resources, thereby improving the performance of the PDCCH.

16 Claims, 6 Drawing Sheets

(56) References Cited

U.S. PATENT DOCUMENTS

| | | | |
|---|---|---|---|
| 2012/0320782 A1 | 12/2012 | Seo et al. | |
| 2013/0010685 A1* | 1/2013 | Kim | H03M 13/271 370/315 |
| 2014/0119317 A1* | 5/2014 | Kim | H04L 5/0073 370/329 |
| 2014/0241310 A1 | 8/2014 | Guan | |

FOREIGN PATENT DOCUMENTS

| | | |
|---|---|---|
| CN | 101895988 A | 11/2010 |
| CN | 101925109 A | 12/2010 |
| CN | 102056185 A | 5/2011 |
| CN | 102065551 A | 5/2011 |
| JP | 2010-288292 A | 12/2010 |
| JP | 2015-501609 A | 1/2015 |
| KR | 10-2011-0120498 A | 11/2011 |
| WO | 2010/148702 A1 | 12/2010 |
| WO | 2011082539 A1 | 7/2011 |
| WO | 2011/128013 A1 | 10/2011 |
| WO | 2011/136523 A2 | 11/2011 |
| WO | 2011/145864 A2 | 11/2011 |
| WO | 2011/159132 A2 | 12/2011 |
| WO | 2013/063948 A1 | 5/2013 |

OTHER PUBLICATIONS

3GPP TS 36.213 V10.3.0, "3rd Generation Partnership Project; Technical Specification Group Radio Access Network; Evolved Universal Terrestrial Radio Access (E-UTRA); Physical layer procedures (Release 10)" Sep. 2011.

Partial supplementary European search report issued by the European Patent Office for corresponding European Patent Application No. 11878932.0, dated Aug. 4, 2015.

Matthew Baker et al: "Chapter 9: Downlink Physical Data and Control Channels", LTE—The UMTS Long Term Evolution: From Theory To Practice, XP-002576365, Chichester: Wiley,GB, pp. 181-206, Jan. 2009.

ZTE, "Mapping scheme and UE procedure for control signaling enhancement", Agenda Item: 7.7.3, 3GPP TSG-RAN WG1 Meeting #67, R1-114401, San Francisco, USA, Nov. 14-18, 2011.

Potevio, "Considerations on search space design for E-PDCCH", Agenda Item: 7.7.3, 3GPP TSG-RAN WG1 Meeting #67, R1-114130, San Francisco, USA, Nov. 14-18, 2011.

Intel Corporation, "Search Space Design of ePDCCH", Agenda Item: 7.7.3, 3GPP TSG-RAN WG1 Meeting #67, R1-113949, San Francisco, USA, Nov. 14-18, 2011.

International search report issued for corresponding international application No. PCT/CN2011/084832, dated Sep. 6, 2012.

Notice of Preliminary Rejection issued by the Korean Intellectual Property Office for corresponding Korean Patent Application No. 10-2014-7018654, dated Jun. 25, 2015, with English translation.

3GPP TS 36.213 V10.4.0, "3rd Generation Partnership Project; Technical Specification Group Radio Access Network; Evolved Universal Terrestrial Radio Access (E-UTRA); Physical layer procedures (Release 10)", Dec. 2011.

2nd Office Action issued by the Japan Patent Office for corresponding Japanese Patent Application No. 2014-549286, dated Mar. 15, 2016, with an English translation.

Extended European search report with supplementary European search report and the European search opinion issued by the European Patent Office for corresponding European Patent Application No. 11878932.0, dated Nov. 24, 2015.

Notice of Final Rejection issued by the Korean Intellectual Property Office for corresponding Korean Patent Application No. 10-2014-7018654, dated Jan. 25, 2016, with English translation.

Notice of Preliminary Rejection issued by the Korean Intellectual Property Office for corresponding Korean Patent Application No. 10-2016-7010821, dated Jun. 17, 2016, with English translation.

Motorola Mobility, "Initial analysis of EPDCCH link performance," Agenda Item: 7.7.2, 3GPP TSG RAN1#63, R1-114030, San Francisco, USA, Nov. 14-18, 2011.

Notice of Preliminary Rejection issued by the Korean Intellectual Property Office for corresponding Korean Patent Application No. 10-2014-7018654, dated May 27, 2016, with English translation.

First Office Action and search report issued for corresponding Chinese Patent Application No. 201180075168.3 dated Jan. 25, 2017 with an English translation.

IPTAB decision issued by the Korean Intellectual Property Office for corresponding Korean Patent Application No. 10-2014-7018654, dated Nov. 30, 2018, with an English translation summary.

* cited by examiner

MAPPING METHOD AND APPARATUS FOR A SEARCH SPACE OF A PHYSICAL DOWNLINK CONTROL CHANNEL

CROSS-REFERENCE TO RELATED APPLICATIONS

This is a continuation of International Application No. PCT/CN2011/084832, filed on Dec. 28, 2011, now pending, the contents of which are herein wholly incorporated by reference.

TECHNICAL FIELD

The present invention relates to wireless communication technologies, and in particular to a mapping method and apparatus for a search space of a physical downlink control channel in an LTE (long-term evolution)/LTE-A (LTE-advanced) system.

BACKGROUND ART

Figure 1:
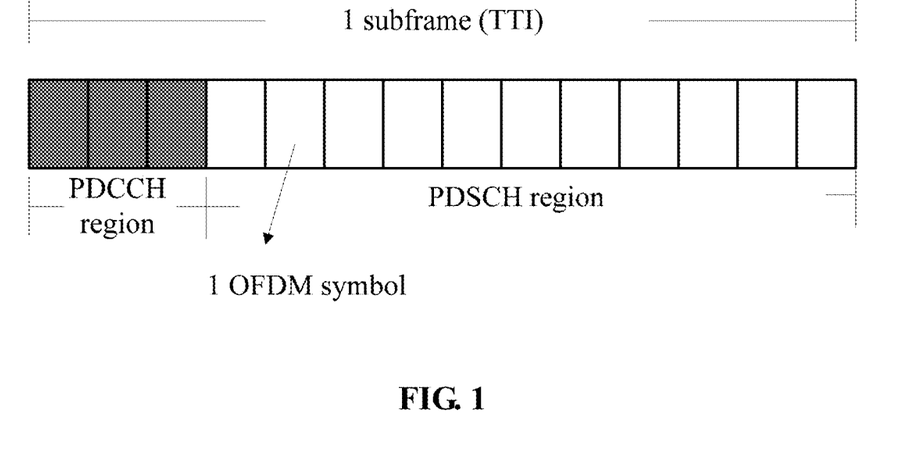
FIG. 1 is a schematic diagram of transmission regions of PDCCH and PDSCH in an LTE system.

In an LTE system, various downlink control information (DCI) is transmitted in a form of physical downlink control channel (PDCCH) by a base station, and data are transmitted in a form of physical downlink shared channels (PDSCH) by the base station. PDCCH and PDSCH are present in a time-division form in each subframe. As shown in FIG. 1, a first to an N-th OFDM (Orthogonal Frequency Division Multiplexing) symbols are possible transmission region of PDCCH, N=1, 2, 3 or 4, which is configured through a higher layer, and OFDM symbols starting from an (N+1)-th OFDM are transmission region of PDSCH. PDCCH supports spatial diversity multi-antenna transmission based on a cell-specific reference signal (CRS), with a maximum number of transmission antennas being 4. A region of PDCCH is further divided into a common search space and a UE-specific search space. Common search spaces of all user equipment (UE) are identical, and all UE searches PDCCH of its own in identical spaces. And the UE-specific search space is related to a radio network temporary identifier (RNTI) of the UE, in which the UE searches PDCCH of its own only. In searching PDCCH by UE, it is assumed that there are four possible aggregation levels, L=1, 2, 4, 8, and each aggregation level has multiple possible locations, referred to as multiple candidates. Position of each candidate may be calculated according to a predefined rule. As shown in Table 1, aggregation level of PDCCH corresponds to control channel element (CCE) one by one, a minimum aggregation level L=1 corresponding to one CCE, and one CCE corresponding to 36 resource elements (REs).

| | Search space $S_k^{(L)}$ | | Number of PDCCH candidates |
| --- | --- | --- | --- |
| Type | Aggregation level L | Size [in CCEs] | $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Figure 2:
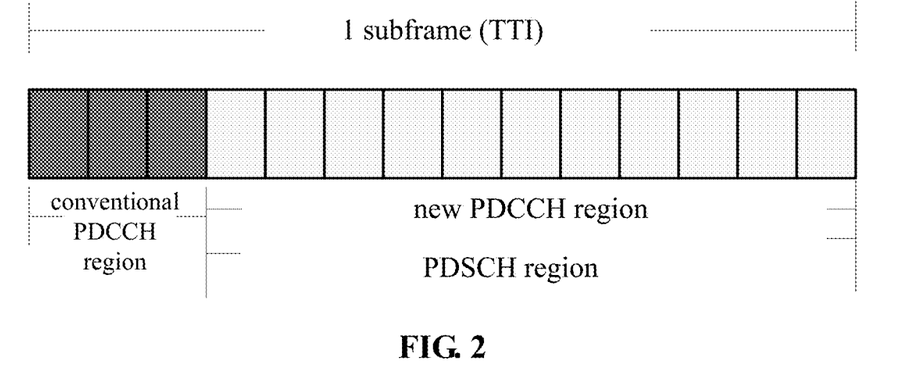
FIG. 2 is a schematic diagram of new transmission regions of PDCCH and PDSCH.

In order to increase data transmission rate and to improve spectrum efficiency, multi-antenna has been widely used in wireless communication systems. In an LTE-advanced system, a downlink may support up to 8 transmission antennas, so as to reach a transmission rate of 1 Gbps. PDSCH may not only increase data transmission rate but also expand the coverage of a signal by precoding and beamforming. And PDCCH cannot support 8 antennas for transmission, and can only support a transmission diversity of up to 4 antennas, hence, it cannot obtain a beamforming gain identical to that of PDSCH. In order to further improve performance of cell-edge UE, a coordinated multipoint transmission technology based on a network architecture of multiple geographically separated remote radio heads (RRHs) shall be widely used in future wireless communication systems. In a network architecture of multiple RRHs, a cell split gain is obtained by simultaneously scheduling PDSCHs of UEs within the coverage of the RRHs, so as to improve the cell capacity. And at the same time, the cell capacity may also be improved in a manner of space multiplexing of PDSCHs of multiple UE. As an existing CRS-based PDCCH cannot obtain a cell split gain, people start to pay attention to the study of a PDCCH based on a DM-RS (demodulation reference symbol), that is, the PDCCH is expanded from conventional former N OFDM symbols to a PDSCH region starting from an (N+1)-th OFDM symbol, as shown in FIG. 2. UE may obtain a location of a new PDCCH region through signaling, that is, information on a subcarrier resource occupied in a frequency domain and/or an OFDM symbol occupied in a time domain, and the UE may perform blind detection in such a region, so as to correctly demodulate a respective PDCCH.

In the implementation of the present invention, the inventors found that resource mapping of a search space of such new PDCCH is orientation of current studies.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

The embodiments of the present invention is to provide a mapping method and apparatus for a search space of a physical downlink control channel, so as to improve the performance of the PDCCH.

According to one aspect of the embodiments of the present invention, there is provided a mapping method for a search space of a physical downlink control channel (PDCCH), including:

determining a search space allocated to the PDCCH according to a resource allocation scheme; and mapping each of candidates of the PDCCH onto a logic time frequency resource of the search space according to a predefined interval.

According to another aspect of the embodiments of the present invention, there is provided a mapping method for a search space of a physical downlink control channel (PDCCH), including:

determining a search space allocated to the PDCCH according to a resource allocation scheme; and mapping uniformly multiple allocating units of a resource block (RB) contained in each candidate of the PDCCH onto the allocated search space.

According to still another aspect of the embodiments of the present invention, there is provided a base station, applicable to mapping of a search space of a PDCCH, wherein the base station includes:

a first determining unit configured to determine a search space allocated to the PDCCH according to a resource allocation scheme; and a first mapping unit configured to map each of candidates of the PDCCH onto a logic time frequency resource of the search space according to a predefined interval.

According to still another aspect of the embodiments of the present invention, there is provided a base station, applicable to mapping of a search space of a PDCCH, wherein the base station includes:

a determining unit configured to determine a search space allocated to the PDCCH according to a resource allocation scheme; and a mapping unit configured to map uniformly multiple allocating units of an RB contained in each candidate of the PDCCH onto the allocated search space.

According to still another aspect of the embodiments of the present invention, there is provided a computer-readable program, wherein when the program is executed in a base station, the program enables a computer to carry out the mapping method for a search space of a PDCCH as described above in the base station.

According to still another aspect of the embodiments of the present invention, there is provided a storage medium in which a computer-readable program is stored, wherein the computer-readable program enables a computer to carry out the mapping method for a search space of a PDCCH as described above in a base station.

The advantage of the embodiments of the present invention resides in that a frequency selective scheduling gain is obtained by mapping different candidates onto discrete time frequency resources, or a frequency diversity gain is obtained by mapping one candidate onto discrete time frequency resources, thereby improving the performance of the PDCCH.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION OF THE INVENTION

Foregoing and other features of the embodiments of the present invention will become apparent with reference to the drawings and the following description. These embodiments are illustrative only and are not intended to limit the present invention. For easy understanding of the principle and embodiments of the present invention by those skilled in the art, the embodiments of the present invention shall be described taking mapping of a search space of a PDCCH transmitted in a PDSCH region (hereinafter referred to as a PDCCH or a new PDCCH or an ePDCCH) in an LTE-A system as an example. However, it should be understood that the embodiments of the present invention are not limited to the above system, and are applicable to other systems or scenarios related to mapping of a search space of a PDCCH.

Currently, resource mapping of such a new PDCCH may be divided into two types. One type is continuous resource mapping, that is, one or more CCEs of one candidate of the PDCCH is/are mapped onto neighboring time-frequency resources. In such a manner of mapping, a base station may transmit the PDCCH to UE in a time-frequency resource of better channel quality based on channel information fed back by the UE or channel information measured by the base station itself, so as to obtain a frequency selective scheduling gain. And the other type is discrete resource mapping, that is, one or more CCEs of one candidate of the PDCCH is/are mapped onto non-neighboring time-frequency resources. In such a manner of mapping, a base station may obtain a frequency domain diversity gain even though it cannot obtain channel information, so as to ensure the performance of the PDCCH.

It was found by the inventors in the implementation of the present invention that a base station usually learns a downlink channel state via information fed back by UE, and schedules the UE accordingly. In an existing feedback mode, considering the compromise between accuracy of the feedback information and feedback overhead, a subband is taken as a unit in feeding back channel information, and the UE may feed back channels of multiple subbands, multiple resource blocks (RBs) within the same subband corresponding to the same channel information, as shown in FIG. 2. Taking a system bandwidth of a 10 MHz (50 RBs) as an example, the UE feeds back channel information, and 6 neighboring subcarriers are taken as a subband. If 6 candidates of a PDCCH correspond to 6 neighboring subcarriers within a subband, the 6 candidates correspond to identical channel information, and the base station cannot determine a subcarrier on which the PDCCH is transmitted so that better performance is obtained according to feedback information.

| System Bandwidth $N_{RB}^{DL}$ | Subband Size (k) |
|---|---|
| 6-7 | No subband (NA) |
| 8-10 | 4 |
| 11-26 | 4 |
| 27-63 | 6 |
| 64-110 | 8 |

Therefore, embodiments of the present invention provide a mapping method and apparatus for a search space of a physical downlink control channel, wherein a frequency selective scheduling gain is obtained by mapping different candidates onto discrete time frequency resources, or a frequency diversity gain is obtained by mapping one candidate onto discrete time frequency resources, thereby improving the performance of the PDCCH.

The present invention shall be described below by way of particular embodiments.

Embodiment 1

Figure 3:
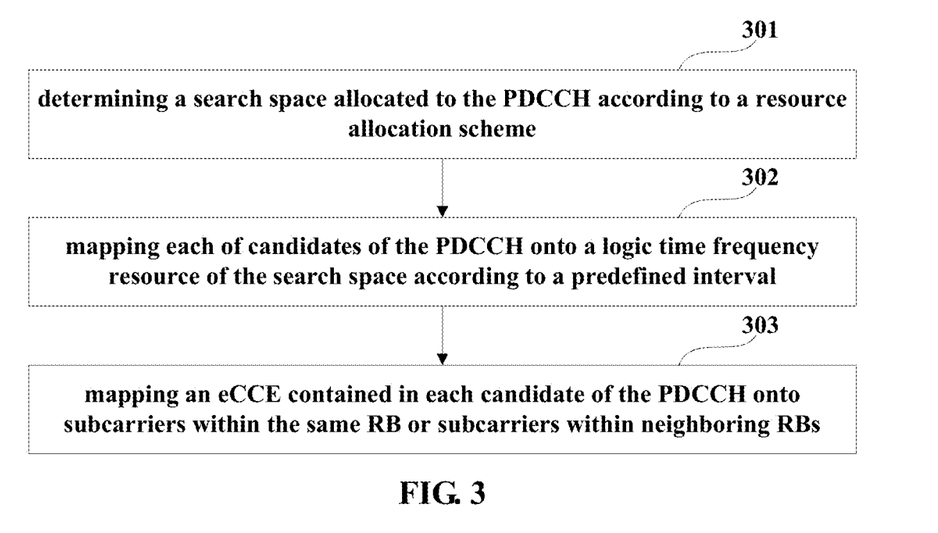
FIG. 3 is a flowchart of a mapping method for a search space of a physical downlink control channel of an embodiment of the present invention.

An embodiment of the present invention provides a mapping method for a search space of a physical downlink control channel. In this embodiment, a control channel element of a PDCCH transmitted in a conventional PDSCH region is defined as an enhanced control channel element (eCCE), and a minimum unit of an aggregation level L=1 corresponds to one eCCE. FIG. 3 is a flowchart of the method, which is a continuous resource mapping manner. Referring to FIG. 3, the method includes:

step 301: determining a search space allocated to the PDCCH according to a resource allocation scheme;

wherein, the resource allocation scheme is for example, type0, type1, and type2, etc., and a search space allocated to the PDCCH may be determined according to different resource allocation schemes; for example, a PDCCH is allocated with 6 RBGs (resource block groups) based on a resource allocation scheme of type0, and since RBG sizes are different according to different system bandwidths, for example, if a system bandwidth is 10 MHz, an RBG size is 3 RBs, thus the PDCCH is allocated with 18 RBs; for another example, a PDCCH is allocated with 3 RBGs based on a resource allocation scheme of type0, if a system bandwidth is 10 MHz, an RBG size is 3 RBs, thus the PDCCH is allocated with 9 RBs; for still another example, a PDCCH is allocated with 12 RBs based on a resource allocation scheme of type2, wherein, the resource allocation scheme may be configured by the system, and may be notified to the UE via high-layer signaling.

Table 3 shows comparison of system bandwidths and RBG sizes.

| System Bandwidths $N_{RB}^{DL}$ | RBG Sizes (P) |
|---|---|
| ≤10 | 1 |
| 11-26 | 2 |
| 27-63 | 3 |
| 64-110 | 4 | step 302: mapping each of candidates of the PDCCH onto a logic time frequency resource of the search space according to a predefined interval.

Wherein, in this embodiment, search spaces of the candidates of the PDCCH are mapped onto discrete logic time frequency resources, so as to avoid as possible that multiple candidates of a PDCCH of one user equipment (UE) correspond to multiple subcarriers within the same subband, resulting in a problem that the multiple candidates correspond to identical channel information and a base station cannot determine a subcarrier on which the PDCCH is transmitted so that better performance is obtained according to fed back information.

Wherein, each of the candidates of the PDCCH may be mapped onto a corresponding physical resource according to a predefined rule after it is mapped onto the logic time frequency resource of the allocated search space, which shall not be described herein any further.

In a preferred embodiment, the interval is a subband size fed back by the UE, as shown in Table 2. That is, one candidate of a PDCCH is mapped every other one subband (taking RB as a unit). In this embodiment, a starting position of a candidate of a PDCCH in a corresponding subband size is not limited. For example, it may start from a first RB of the corresponding subband size, and may also start from a second RB of the corresponding subband size, etc. In this embodiment, if the number of the resources of the search space is less than a product of a total number of the candidates of the PDCCH and the subband size, for example, the number of the resources of the search space is 18 RBs, the total number of the candidates of the PDCCH is 6 and the subband size is 6 RBs, at this moment, as candidates are mapped every other one subband, and not all the candidates can be mapped, the rest of the candidates may be mapped in a cyclic shift scheme; that is, part of the candidates of the PDCCH are mapped first onto logic time frequency resources to which each of the subbands corresponds, and then the rest of the candidates are mapped in a cyclic shift scheme onto logic time frequency resources to which each of the subbands corresponds. In such a scenario, in mapping the candidate of the PDCCH according to step 302, only a part of the candidates of the PDCCH may be mapped, and the rest of the candidates are mapped in a cyclic shift scheme onto the logic time frequency resources to which the subband corresponds, which shall be described below by way of particular embodiments. In this embodiment, the total number of the candidates of the PDCCH is determined according to a value of an aggregation level and Table 1. For example, as shown in Table 1, if the aggregation level L=1 or 2, the number of the candidates of the PDCCH is 6, and if the aggregation level L=4 or 8, the number of the candidates of the PDCCH is 2.

In another preferred embodiment, the interval is a resource block group (RBG) of the UE, as shown in Table 3. That is, one candidate of a PDCCH is mapped every other one RBG (taking RB as a unit). In this embodiment, a starting position of a candidate of a PDCCH in a corresponding RBG is also not limited. For example, it may start from a first RB of the corresponding RBG, and may also start from a second RB of the corresponding RBG, etc. In this embodiment, if the number of the resources of the search space is less than a product of a total number of the candidates of the PDCCH and the RBG, for example, the number of the resources of the search space is 12 RBs, the total number of the candidates of the PDCCH is 6 and the RBG is 3 RBs, at this moment, as candidates are mapped every other one RBG, only 4 candidates may be mapped, not all the 6 candidates can be mapped, and the rest 2 candidates are mapped in a cyclic shift scheme; that is, 4 candidates of the PDCCH are mapped first onto logic time frequency resources to which each of the RBGs corresponds, and then the rest 2 candidates are mapped in a cyclic shift scheme onto logic time frequency resources to which a first RBG and a second RBG correspond. In such a scenario, in mapping the candidate of the PDCCH according to step 302, only a part of the candidates of the PDCCH may be mapped, and the rest of the candidates are mapped in a cyclic shift scheme onto the logic time frequency resources to which each of the RBGs corresponds according to the method of this embodiment, which shall be described below by way of particular embodiments. In this embodiment, the total number of the candidates of the PDCCH is determined according to a value of an aggregation level and Table 1. For example, as shown in Table 1, if the aggregation level L=1 or 2, the number of the candidates of the PDCCH is 6, and if the aggregation level L=4 or 8, the number of the candidates of the PDCCH is 2.

In the above two embodiments, description is given taking a subband as interval and an RBG as interval respectively. However, this embodiment is not limited thereto, and the mapping as described in step 302 may also be performed according to other intervals as needed in practical application. Wherein, if the number of the resources of the search space is less than a product of the total number of the candidates of the PDCCH and a predefined interval, part of the candidates of the PDCCH may be mapped first onto logic time frequency resources to which each of the predefined intervals corresponds, and then the rest of the candidates may be mapped in a cyclic shift scheme onto the logic time frequency resources to which each of the predefined intervals corresponds. Furthermore, the position of each of the candidates of the PDCCH in the corresponding logic time frequency resource to which the predefined intervals correspond is also random as described above, the description of which being omitted herein.

In the embodiment of the present invention, by mapping each of candidates of a PDCCH onto a logic time frequency resource of an allocated search space according to a predefined interval, such that search spaces of the candidates are made to be discrete logic time frequency resources, thereby avoiding to a certain extent a problem that a base station cannot determine a subcarrier according to feedback information due to multiple candidates of a PDCCH correspond to subcarriers within the same subband, and improving transmission performance of the PDCCH.

According to another mode of implementation of this embodiment, the method further includes:

step 303: mapping an eCCE contained in each candidate of the PDCCH onto subcarriers within the same RB or subcarriers within neighboring RBs;

wherein, in this embodiment, one or more eCCEs contained in each candidate of the PDCCH is/are mapped as possible onto subcarriers within the same RB or subcarriers within neighboring RBs; and in the same RB, the one or more eCCEs may be mapped onto neighboring or non-neighboring subcarriers, and this embodiment is not limited thereto.

In this mode of implementation, after the mapping position of each of the candidates is determined in steps 301 and 302, for the one or more eCCEs contained in each candidate, they may be mapped into the same RB or neighboring RBs, at their corresponding mapping positions, that is, their corresponding intervals (a subband or an RBG, etc.), so that the search space of the one or more eCCEs contained in each candidate may be in the same subband, thereby ensuring that all the eCCEs of the candidate can obtain frequency selective scheduling gains.

In the above embodiment, after performing the above mapping of a space search, a base station may further transmit an index of a corresponding allocating unit within one predefined interval to the UE. For example, an index of a corresponding RB or a smaller unit in an RBG or a subband is informed to the UE, so as to reduce the number of times of blind detection by the UE. In this embodiment, the transmission mode is not limited. For example, the index of the RB or the unit of the UE may be configured via high-layer signaling.

For the mapping method for a search space of a physical downlink control channel to be more clear and easy to understand, it shall be described below by way of particular examples. In an LTE/LTE-A system, in order to improve spectrum efficiency, the RB may be usually divided into smaller time frequency resource blocks. In the following examples, description is given taking that one eCCE is divided into 2 smaller units, one RB corresponding to 4 units, as an example.

Figure 4:
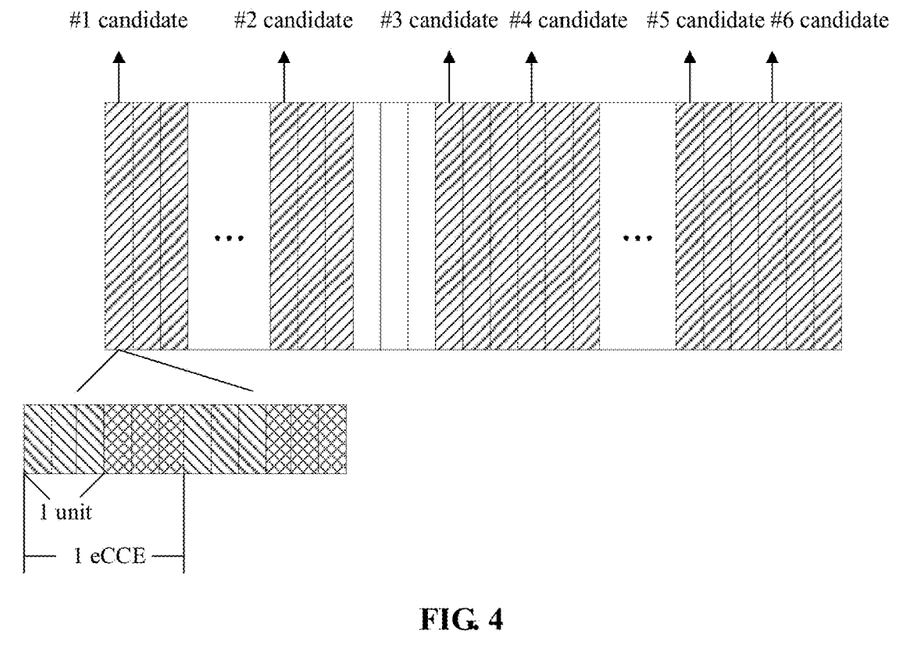
FIG. 4 is a schematic diagram of performing mapping of a search space of a PDCCH taking an RGB as a step in FIG. 3.
Figure 5:
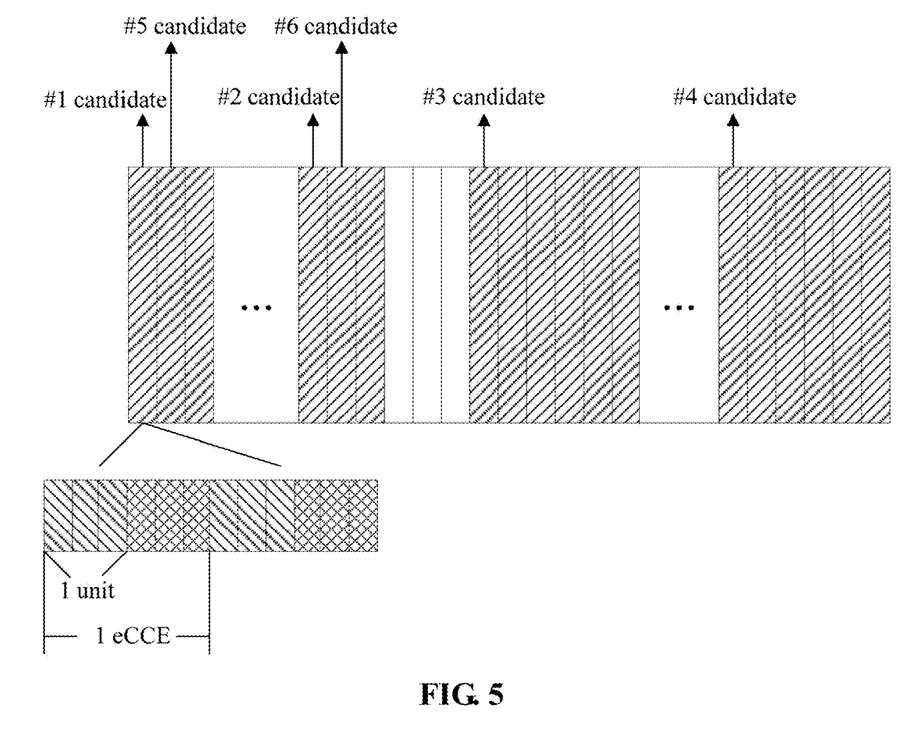
FIG. 5 is a schematic diagram of performing mapping of a search space of a PDCCH taking a subband as a step in FIG. 3.

FIG. 4 is a schematic diagram of mapping of a search space of a PDCCH taking an RGB as a step of an embodiment of the present invention, and FIG. 5 is a schematic diagram of mapping of a search space of a PDCCH taking a subband as a step of an embodiment of the present invention.

Referring to FIGS. 4 and 5, in the embodiments of FIGS. 4 and 5, it is assumed that the search space of the PDCCH of the UE is configured via high-layer signaling, and the PDCCH of the UE is allocated with 6 RBGs in the resource allocation scheme of type 0. Assuming that the system bandwidth is 10 MHz, it can be seen from Table 3 that the RBG size is 3 RBs, and it can be seen from Table 2 that a feedback subband size is 6 RBs. Assuming that an aggregation level of the PDCCH is L=1 or 2, it can be seen from Table 1 that the PDCCH of the UE has 6 candidates, and as aggregation level of the PDCCH corresponds to CCEs/eCCEs one by one, one eCCE includes 2 units, and one RB corresponds to 4 units, each candidate of the PDCCH of the UE corresponds to a half of or one RB.

As shown in FIG. 4, in this embodiment, 18 RBs as shown in FIG. 4 are allocated to the PDCCH, each 3 RBs being an RBG. According to the method of this embodiment, 6 candidates of the PDCCH are mapped taking an RBG as a step, and the 6 candidates correspond to different RBGs. As shown in FIG. 4, the first candidate (#1 candidate) corresponds to the first RBG, the second candidate (#2 candidate) corresponds to the second RBG, the third candidate (#3 candidate) corresponds to the third RBG, the fourth candidate (#4 candidate) corresponds to the fourth RBG, the fifth candidate (#5 candidate) corresponds to the fifth RBG, and the sixth candidate (#6 candidate) corresponds to the sixth RBG, while one or more eCCEs within one candidate are mapped onto neighboring subcarriers. Wherein, if the number of allocated search spaces is less than a product of a total number of the candidates and an RBG size, namely, the number of the RBGs in the search spaces allocated to the PDCCH is not enough for mapping all the candidates, the rest of the candidates are mapped to RBG/RBGs in a cyclic shift scheme.

As shown in FIG. 5, in this embodiment, 18 RBs as shown in FIG. 5 are allocated to the PDCCH. Wherein, the former three RBs occupy one subband, the fourth to the sixth RBs occupy one subband, the seventh to the twelfth RBs occupy one subband, and the thirteenth to the eighteenth RBs occupy one subband. According to the method of this embodiment, 6 candidates of the PDCCH are mapped taking a subband as a step, the candidates are mapped according to different subbands. In this embodiment, the resource allocated to the PDCCH is only 18 RBs, occupying 4 subbands, which can only map 4 candidates (#1 candidate, #2 candidate, #3 candidate and #4 candidate), and is insufficient for mapping all the 6 candidates. Therefore, the rest 2 candidates (#5 candidate and #6 candidate) are mapped onto subbands in a cyclic shift scheme, as shown in FIG. 5. That is, in the embodiment of FIG. 5, if the number of the allocated resources of the search space is less than the product of the total number of the candidates and the subband size, which is 18<6×6 in this embodiment, the rest candidates are mapped onto subbands in a cyclic shift scheme.

In the embodiments of FIGS. 4 and 5, preferably, in configuring the search space via high-layer signaling in the above two manners, the UE needs to be informed of an index of a corresponding RB or smaller unit within an RBG or a subband, so that the UE determines a search space of itself, thereby reducing the number of times of blind detection.

Figure 6:
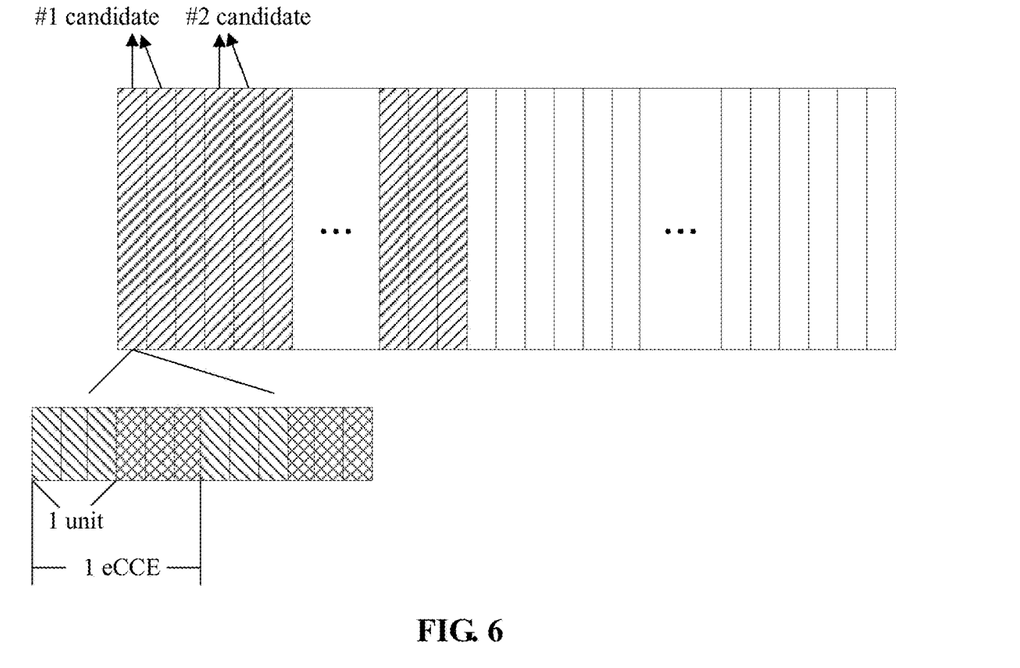
FIG. 6 is another schematic diagram of performing mapping of a search space of a PDCCH taking an RGB as a step in FIG. 3.
Figure 7:
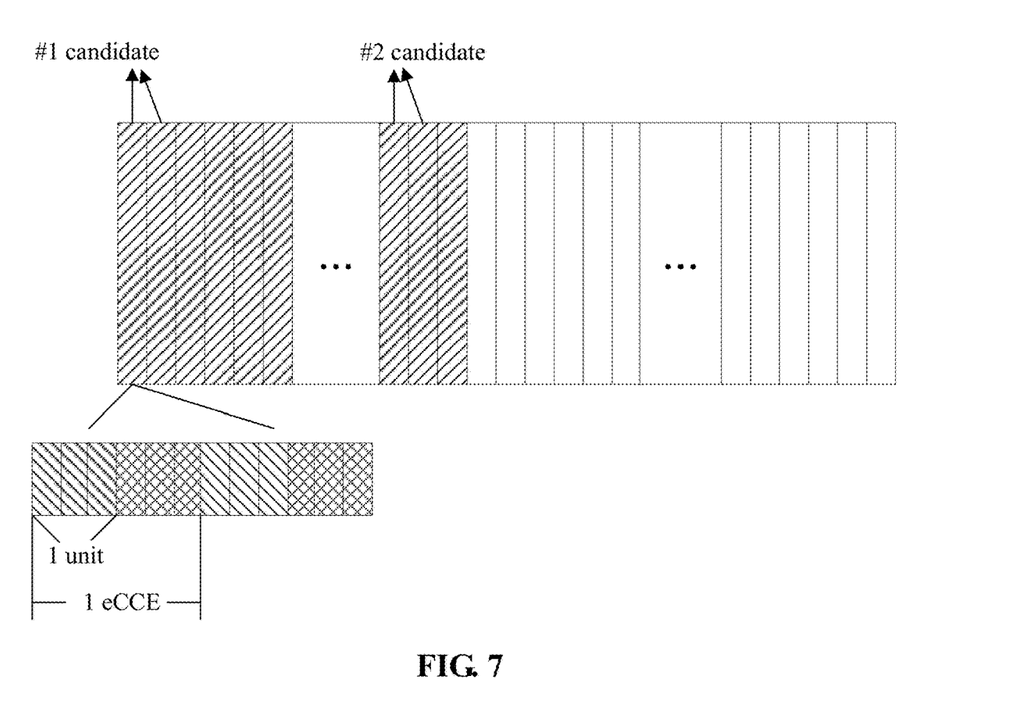
FIG. 7 is another schematic diagram of performing mapping of a search space of a PDCCH taking a subband as a step in FIG. 3.

FIG. 6 is a schematic diagram of mapping of a search space of a PDCCH taking an RGB as a step in another embodiment of the present invention, and FIG. 7 is a schematic diagram of mapping of a search space of a PDCCH taking a subband as a step in another embodiment of the present invention.

Referring to FIGS. 6 and 7, in the embodiments of FIGS. 6 and 7, it is assumed that the search space of the PDCCH of the UE is configured via high-layer signaling, and the PDCCH of the UE is allocated with 3 RBGs in the resource allocation scheme of type 0. Assuming that the system bandwidth is 10 MHz, it can be seen from Table 3 that the RBG size is 3 RBs, and it can be seen from Table 2 that a feedback subband size is 6 RBs. Assuming that an aggregation level of the PDCCH is L=4, it can be seen from Table 1 that the PDCCH of the UE has 2 candidates, and as aggregation level of the PDCCH corresponds to CCEs/eCCEs one by one, one eCCE includes 2 units, and one RB corresponds to 4 units, each candidate of the PDCCH of the UE corresponds to 2 RBs.

As shown in FIG. 6, in this embodiment, 9 RBs as shown in FIG. 6 are allocated to the PDCCH, each 3 RBs being an RBG. According to the method of this embodiment, 2 candidates of the PDCCH are mapped taking an RBG as a step, and the 2 candidates correspond to different RBGs. Wherein, 4 eCCEs to which the first candidate (#1 candidate) corresponds are mapped onto two RBs of the first RBG, and 4 eCCEs to which the second candidate (#2 candidate) corresponds are mapped onto two RBs of the second RBG.

As shown in FIG. 7, in this embodiment, 9 RBs as shown in FIG. 7 are allocated to the PDCCH. Wherein, the former six RBs occupy one subband, and the seventh to the ninth RBs occupy one subband. According to the method of this embodiment, 2 candidates of the PDCCH are mapped taking a subband as a step, and the 2 candidates correspond to different subbands. Wherein, 4 eCCEs to which the first candidate (#1 candidate) corresponds are mapped onto two RBs of the first subband, and 4 eCCEs to which the second candidate (#2 candidate) corresponds are mapped onto two RBs of the second subband.

In the embodiments of FIGS. 6 and 7, preferably, in configuring the search space via high-layer signaling in the above two manners, the UE needs to be informed of an index of a corresponding RB or smaller unit within an RBG or a subband, so that the UE determines a search space of itself, thereby reducing the number of times of blind detection.

Figure 8:
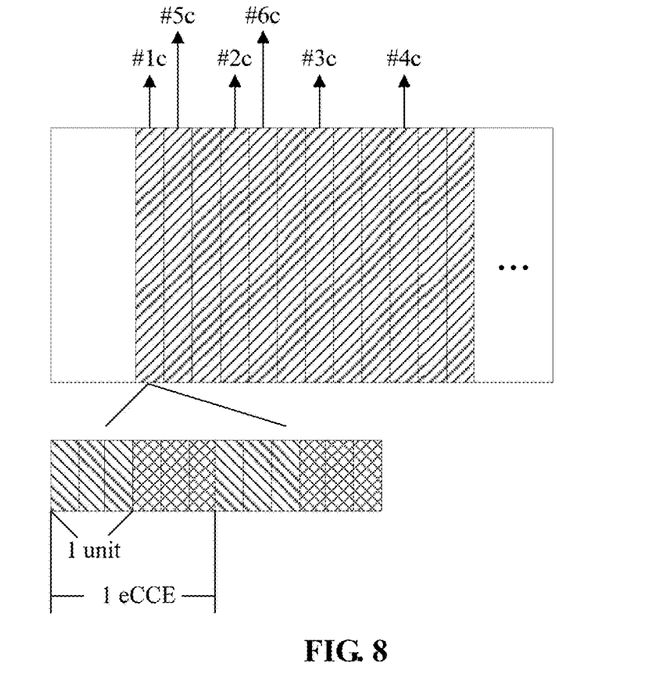
FIG. 8 is still another schematic diagram of performing mapping of a search space of a PDCCH taking an RGB as a step in FIG. 3.
Figure 9:
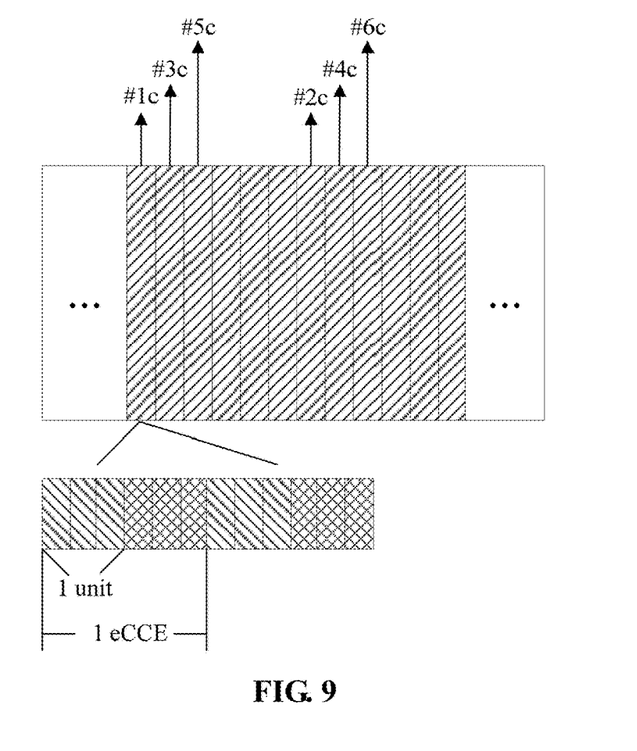
FIG. 9 is still another schematic diagram of performing mapping of a search space of a PDCCH taking a subband as a step in FIG. 3.

FIG. 8 is a schematic diagram of mapping of a search space of a PDCCH taking an RGB as a step in still another embodiment of the present invention, and FIG. 9 is a schematic diagram of mapping of a search space of a PDCCH taking a subband as a step in still another embodiment of the present invention.

Referring to FIGS. 8 and 9, in the embodiments of FIGS. 8 and 9, it is assumed that the search space of the PDCCH of the UE is configured via high-layer signaling, and the PDCCH of the UE is allocated with 12 RBs in the resource allocation scheme of type 2. Assuming that the system bandwidth is 10 MHz, it can be seen from Table 3 that the RBG size is 3 RBs, and it can be seen from Table 2 that a feedback subband size is 6 RBs. Assuming that an aggregation level of the PDCCH is L=1 or 2, it can be seen from Table 1 that the PDCCH of the UE has 6 candidates, and as aggregation level of the PDCCH corresponds to CCEs/eCCEs one by one, one eCCE includes 2 units, and one RB corresponds to 4 units, each candidate of the PDCCH of the UE corresponds to a half of or one RB.

As shown in FIG. 8, according to the method of this embodiment, the candidates of the PDCCH are mapped taking an RBG as a step, and the candidates should correspond to different RBGs. However, as the number of the allocated resources is less than the product of the number of the candidates and the RBG size, that is, 12<6×3, and the allocated 12 RBs are divided into 4 RBGs, if each candidate is mapped onto one RBG, the 4 RBGs are insufficient for mapping 6 candidates. Therefore, in this embodiment, 4 candidates are first mapped onto the RBGs, and the rest 2 candidates are mapped onto RBGs in a cyclic shift scheme. As shown in FIG. 8, the first candidate (#1c) corresponds to the first RBG, the second candidate (#2c) corresponds to the second RBG, the third candidate (#3c) corresponds to the third RBG, the fourth candidate (#4c) corresponds to the fourth RBG, the fifth candidate (#5c) corresponds to the first RBG, and the sixth candidate (#6c) corresponds to the second RBG. Wherein, one or more eCCEs within one candidate is/are mapped onto neighboring subcarriers. In the embodiment shown in FIG. 8, as the allocated search space is less than the product of the total number of candidates and the RBG size, candidates that may be mapped are mapped onto the RBGs, and the rest candidates are mapped onto RBGs in a cyclic shift manner.

As shown in FIG. 9, according to the method of this embodiment, the candidates of the PDCCH are mapped taking a subband as a step, and the candidates should correspond to different subbands. However, as the number of the allocated resources is less than the product of the number of the candidates and the subband size, that is, 12<6×6, and the allocated 12 RBs occupy 2 subbands, if each candidate is mapped onto one subband, the 2 subbands are insufficient for mapping 6 candidates. Therefore, in this embodiment, 2 candidates are first mapped onto the subbands, 2 other candidates are then mapped onto the subbands in a cyclic shift scheme, and the rest 2 candidates are finally mapped onto the subbands in a cyclic shift scheme. As shown in FIG. 9, the first, the third and the fifth candidates (#1c, #3c and #5c) correspond to the first subband, and the second, the fourth and the sixth candidates (#2c, #4c and #6c) correspond to the second subband. Wherein, one or more eCCEs within one candidate is/are mapped onto neighboring subcarriers. In the embodiment shown in FIG. 9, as the allocated search space is less than the product of the total number of candidates and the subband size, candidates that may be mapped are mapped onto the subbands, and the rest candidates are mapped onto the subbands in a cyclic shift manner.

In the embodiments of FIGS. 8 and 9, preferably, in configuring the search space via high-layer signaling in the above two manners, the UE needs to be informed of an index of a corresponding RB or smaller unit within an RBG or a subband, so that the UE determines a search space of itself, thereby reducing the number of times of blind detection.

With the method of the embodiment of the present invention, a frequency selective scheduling gain is obtained by mapping different candidates of a PDCCH onto discrete time frequency resources, thereby improving the performance of the PDCCH.

Embodiment 2

Figure 10:
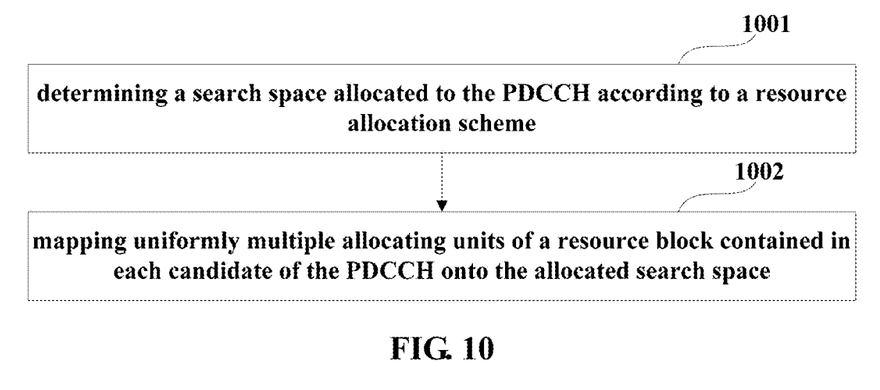
FIG. 10 is a flowchart of a mapping method for a search space of a physical downlink control channel of another embodiment of the present invention.

An embodiment of the present invention provides a mapping method for a search space of a physical downlink control channel. In this embodiment, a control channel element of a PDCCH transmitted in a conventional PDSCH region is defined as an enhanced control channel element (eCCE), and a minimum unit of an aggregation level L=1 corresponds to one eCCE. FIG. 10 is a flowchart of the method, which is a discrete resource mapping manner. Referring to FIG. 10, the method includes:

step 1001: determining a search space allocated to the PDCCH according to a resource allocation scheme;

wherein, step 1001 is carried out in the same way of step 301, and related contents of step 301 are incorporated herein, which shall not be described herein any further;

step 1002: mapping uniformly multiple allocating units of a resource block (RB) contained in each candidate of the PDCCH onto the allocated search space.

Wherein, an RB may further be divided into smaller time frequency resource blocks as actually demanded. For example, one RB is divided into multiple units, each unit being a minimum allocation element of the RB. In this embodiment, multiple allocation elements of the RB to which each candidate corresponds are referred to as multiple units contained in each candidate, and different subband information may be reflected by discretely mapping multiple units of one candidate, thereby optimizing performance of the PDCCH.

Wherein, in this embodiment, in addition to mapping uniformly the multiple units of each candidate of the PDCCH onto the allocated search space, the candidates may also be mapped onto neighboring logic time frequency resources of the allocated search space. However, this embodiment is not limited thereto.

In this embodiment, the meaning of the logic time frequency resource is the same as that described above, which shall not be described herein any further.

Different from Embodiment 1, this embodiment is focused on performing discrete mapping of one candidate of the PDCCH (i.e. performing discrete mapping taking an allocation element within the candidate as a unit), rather than performing discrete mapping of candidates of the PDCCH (i.e. performing discrete mapping taking a candidate as a unit). With the method of the embodiment of the present invention, a search space/search spaces of one or more eCCEs contained in each candidate of the PDCCH is/are a discrete logic time frequency resource/discrete logic time frequency resources, and a frequency selective scheduling gain is obtained by mapping one candidate of the PDCCH onto discrete time frequency resource(s), thereby improving the performance of the PDCCH.

For the mapping method for a search space of a physical downlink control channel of this embodiment to be more clear and easy to understand, it shall be described below by way of particular examples. In an LTE/LTE-A system, in order to improve spectrum efficiency, one RB may be usually divided into smaller time frequency resource blocks. In the following examples, description is given taking that one eCCE is divided into 2 smaller units, and one RB corresponding to 4 units, as an example.

Figure 11:
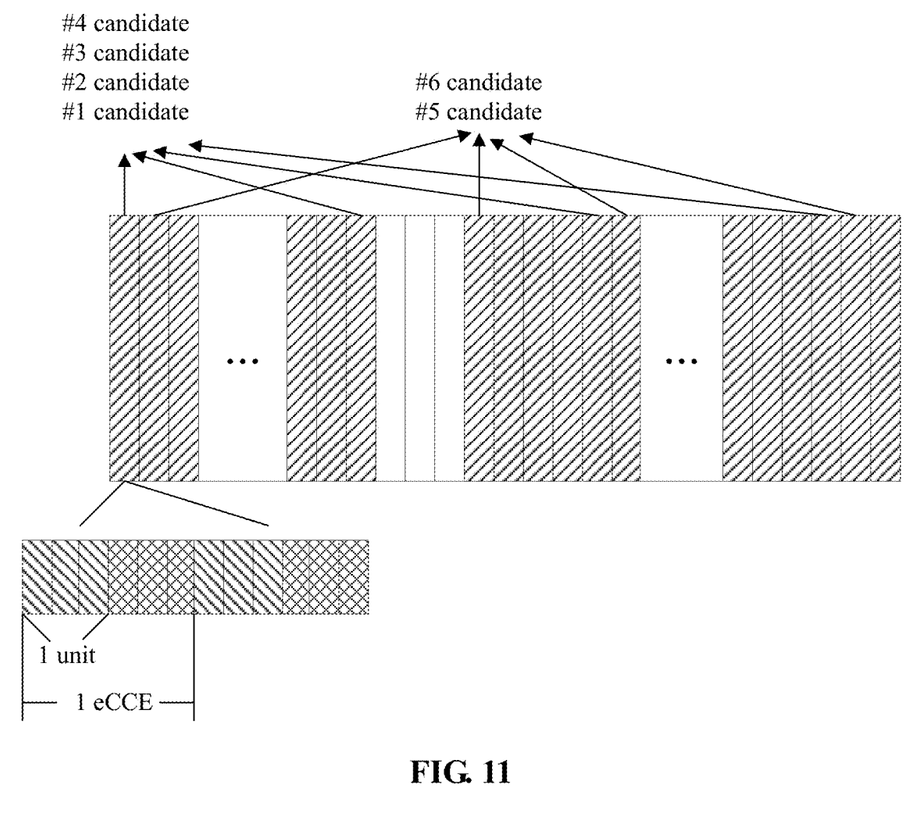
FIG. 11 is a schematic diagram of a search space of a PDCCH according to the mapping method of FIG. 10.

FIG. 11 is a schematic diagram of mapping of a search space of a PDCCH of an embodiment of the present invention. Referring to FIG. 11, it is assumed that the search space of the PDCCH of the UE is configured via high-layer signaling, and the PDCCH of the UE is allocated with 18 RBs in the resource allocation scheme of type 0. Assuming that an aggregation level of the PDCCH is L=2, each candidate of the PDCCH corresponds to 4 units. It can be seen from Table 1 that the PDCCH of the UE has 6 candidates. As shown in FIG. 11, one RB may contain 4 units, and according to the method of this embodiment, one RB corresponds to 4 candidates, which are #1 candidate, #2 candidate, #3 candidate and #4 candidate, respectively; wherein, each candidate corresponds to one unit of one RB. Furthermore, as shown in FIG. 11, 4 units of each candidate are spaced apart by 5 RBs in the frequency domain. For example, #1 candidate, #2 candidate, #3 candidate and #4 candidate occupy the first, the sixth, the eleventh and the sixteenth RBs, and #5 candidate and #6 candidate occupy the second, the seventh, the twelfth and the seventeenth RBs, thereby achieving discrete mapping of multiple units within one candidate.

In the embodiment of FIG. 11, preferably, in configuring the search space via high-layer signaling, the UE needs to be informed of an index of a corresponding RB or smaller unit within an RBG, so that the UE determines a search space of itself, thereby reducing the number of times of blind detection.

With the method of the embodiment of the present invention, a frequency diversity gain is obtained by mapping each candidate of the PDCCH onto a discrete time frequency resource, thereby improving the performance of the PDCCH.

An embodiment of the present invention further provides a base station, as described in Embodiment 3 below. As the principle of the base station for solving problem is similar to that of the mapping method for a search space of a physical downlink control channel in Embodiment 1, the implementation of the method may be referred to for the implementation of the base station, and the repeated parts shall not be described any further.

Embodiment 3

Figure 12:
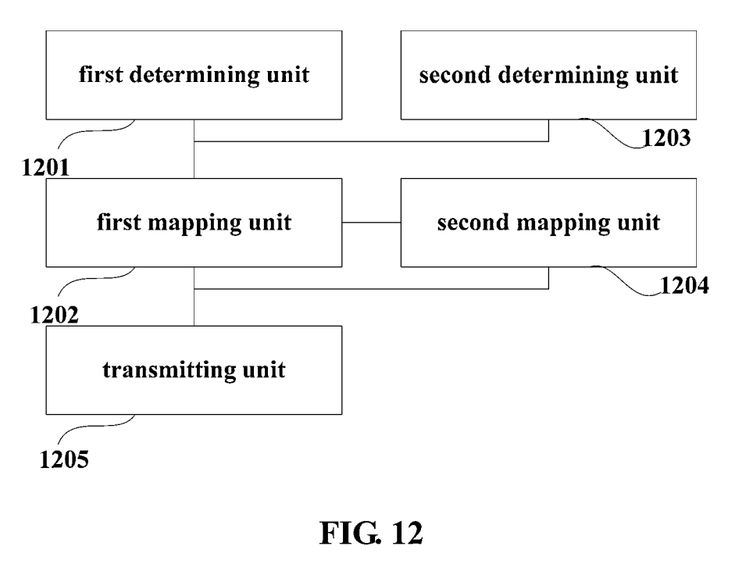
FIG. 12 is a schematic diagram of the structure of a base station of an embodiment of the present invention.

An embodiment of the present invention further provides a base station, applicable to mapping of a search space of a PDCCH. FIG. 12 is a schematic diagram of the structure of the base station. Referring to FIG. 12, the base station includes:

a first determining unit 1201 configured to determine a search space allocated to the PDCCH according to a resource allocation scheme; and a first mapping unit 1202 configured to map each of candidates of the PDCCH onto a logic time frequency resource of the search space according to a predefined interval.

In an embodiment, the predefined interval is a subband size fed back by UE.

In another embodiment, the predefined interval is an RBG of UE.

In the above two embodiments, if the number of the resources of the search space is less than a product of a total number of the candidates of the PDCCH and the predefined interval, the first mapping unit 1202 maps first part of the candidates of the PDCCH onto logic time frequency resources to which each of the predefined intervals corresponds, and then maps in a cyclic shift scheme the rest of the candidates onto logic time frequency resources to which each of the predefined intervals corresponds.

In an embodiment, the base station further includes:

a second determining unit 1203 configured to determine the total number of the candidates of the PDCCH according to an aggregation level, so that the first mapping unit 1202 determines whether the number of the resources of the search space is less than the product of the total number of the candidates of the PDCCH and the predefined interval, and performs the mapping of the search spaces of candidates of the PDCCH accordingly.

In an embodiment, the base station further includes:

a second mapping unit 1204 configured to map an eCCE contained in each candidate of the PDCCH onto subcarriers within the same RB or subcarriers within neighboring RBs; wherein, it may be mapped onto neighboring subcarriers or non-neighboring subcarriers.

In an embodiment, the base station further includes:

a transmitting unit 1205 configured to transmit an index of a corresponding allocating unit within one predefined interval to UE; for example, an index of a corresponding RB or smaller unit within an RBG or a subband is transmitted to the UE, so that the UE determines a search space of itself, thereby reducing the number of times of blind detection.

In this embodiment, a position of each of the candidates of the PDCCH at a corresponding logic time frequency resource to which the predefined interval corresponds is random.

In this embodiment, each of the candidates of the PDCCH may be mapped onto a corresponding physical time frequency resource according to a predefined rule after it is mapped onto the logic time frequency resource of the allocated search space, which shall not be described herein any further.

With the base station of this embodiment, a frequency selective scheduling gain is obtained by mapping different candidates of the PDCCH onto discrete time frequency resources, thereby improving the performance of the PDCCH.

An embodiment of the present invention further provides a base station, as described in Embodiment 4 below. As the principle of the base station for solving problem is similar to that of the mapping method for a search space of a physical downlink control channel in Embodiment 2, the implementation of the method may be referred to for the implementation of the base station, and the repeated parts shall not be described any further.

Embodiment 4

Figure 13:
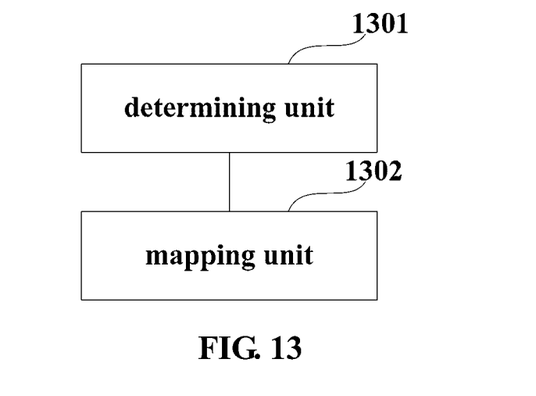
FIG. 13 is a schematic diagram of the structure of a base station of another embodiment of the present invention.

An embodiment of the present invention further provides a base station, applicable to mapping of a search space of a PDCCH. FIG. 13 is a schematic diagram of the structure of the base station. Referring to FIG. 13, the base station includes:

a determining unit 1301 configured to determine a search space allocated to the PDCCH according to a resource allocation scheme; and a mapping unit 1302 configured to map uniformly multiple allocating units of an RB contained in each candidate of the PDCCH onto the allocated search space.

Wherein, an RB may further be divided into smaller time frequency resource blocks as actually demanded. For example, one RB is divided into multiple units, each unit being a minimum allocation element of the RB. In this embodiment, multiple allocation elements of the RB contained in each candidate are referred to as multiple units contained in each candidate.

Wherein, in addition to mapping uniformly the multiple units of each candidate of the PDCCH onto the allocated search space, the mapping unit 1302 may also map the candidates onto neighboring logic time frequency resources.

Wherein, the base station may further include a transmitting unit (not shown) configured to transmit an index of a corresponding RB or smaller unit within an RBG to UE, so that the UE determines a search space of itself, thereby reducing the number of times of blind detection.

With the base station of this embodiment, a frequency diversity gain is obtained by mapping each candidate of the PDCCH onto discrete time frequency resources respectively, thereby improving the performance of the PDCCH.

An embodiment of the present invention further provides a computer-readable program, wherein when the program is executed in a base station, the program enables a computer to carry out the mapping method for a search space of a PDCCH as described in Embodiment 1 or 2 in the base station.

An embodiment of the present invention further provides a storage medium in which a computer-readable program is stored, wherein the computer-readable program enables a computer to carry out the mapping method for a search space of a PDCCH as described in Embodiment 1 or 2 in a base station.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A mapping method for a search space of a physical downlink control channel (PDCCH), comprising:
determining a search space allocated to the PDCCH according to a resource allocation scheme;
mapping discretely multiple candidates of the PDCCH onto time frequency resources of the search space by taking a candidate of the PDCCH as a unit according to a predefined interval, wherein different candidates of the PDCCH are mapped onto discrete time-frequency resources, and
mapping discretely multiple allocating units of a resource block (RB) contained in each candidate of the PDCCH onto time frequency resources to which the candidate of the PDCCH corresponds by taking an allocating unit of RB contained in each candidate of the PDCCH as a unit,
wherein the time frequency resources to which the candidate of the PDCCH corresponds are discrete, different allocating units of one candidate of the PDCCH are mapped onto discrete time frequency resources, and the allocation units are smaller time-frequency resource blocks obtained by dividing the RB.

2. The method according to claim 1, wherein the predefined interval is a value that different candidates of the control channel are mapped onto resources not adjacent to each other.

3. The method according to claim 2, wherein the predefined interval is a subband size fed back by user equipment (UE).

4. The method according to claim 2, wherein the predefined interval is a resource block group (RBG) of user equipment (UE).

5. The method according to claim 2, wherein when the number of the resources of the search space is less than a product of a total number of the candidates of the PDCCH and the predefined interval, part of the candidates of the PDCCH are mapped first onto time frequency resources to which each of the predefined intervals corresponds, and then the rest of the candidates are mapped in a cyclic shift scheme onto time frequency resources to which each of the predefined intervals corresponds.

6. The method according to claim 5, wherein the method further comprises:
determining the total number of the candidates of the PDCCH according to an aggregation level.

7. The method according to claim 2, wherein a position of each of the candidates of the PDCCH at a corresponding time frequency resource to which the predefined interval corresponds is random.

8. The method according to claim 2, wherein the method further comprises:
transmitting an index of a corresponding allocating unit within one predefined interval to user equipment (UE).

9. A base station, applicable to mapping of a search space of a physical downlink control channel (PDCCH), wherein the base station comprises:
a first determining unit configured to determine a search space allocated to the PDCCH according to a resource allocation scheme;
a first mapping unit configured to map discretely multiple candidates of the PDCCH onto time frequency resources of the search space by taking a candidate of the PDCCH as a unit according to a predefined interval, wherein different candidates of the PDCCH are mapped onto discrete time-frequency resources, and
a second mapping unit configured to map discretely multiple allocating units of resource blocks (RBs) contained in each candidate of the PDCCH onto time frequency resources to which the candidate of the PDCCH corresponds by taking an allocating unit of RB contained in each candidate of the PDCCH as a unit,
wherein the time frequency resources to which the candidate of the PDCCH corresponds are discrete, different allocating units of one candidate of the PDCCH are mapped onto discrete time frequency resources, and the allocation units are smaller time-frequency resource blocks obtained by dividing the RB.

10. The base station according to claim 9, wherein the predefined interval is a value that different candidates of the control channel are mapped to resources not adjacent to each other.

11. The base station according to claim 10, wherein the predefined interval is a subband size fed back by user equipment (UE).

12. The base station according to claim 10, wherein the predefined interval is a resource block group (RBG) of user equipment (UE).

13. The base station according to claim 10, wherein when the number of the resources of the search space is less than a product of a total number of the candidates of the PDCCH and the predefined interval, the first mapping unit maps first part of the candidates of the PDCCH onto time frequency resources to which each of the predefined intervals corresponds, and then maps in a cyclic shift scheme the rest of the candidates onto time frequency resources to which each of the predefined intervals corresponds.

14. The base station according to claim 13, wherein the base station further comprises:
a second determining unit configured to determine the total number of the candidates of the PDCCH according to an aggregation level.

15. The base station according to claim 10, wherein a position of each of the candidates of the PDCCH at a corresponding time frequency resource to which the predefined interval corresponds is random.

16. The base station according to claim 10, wherein the base station further comprises:
a transmitting unit configured to transmit an index of a corresponding allocating unit within one predefined interval to user equipment (UE).

* * * * *